US007685730B2

(12) United States Patent
Dozier

(10) Patent No.: US 7,685,730 B2
(45) Date of Patent: Mar. 30, 2010

(54) TILE MARKING AND/OR CUTTING DEVICE

(76) Inventor: Eula C. Dozier, 143 Burning Brush Dr., Rochester, NY (US) 14606

(*) Notice: Subject to any disclaimer, the term of this patent is extended or adjusted under 35 U.S.C. 154(b) by 33 days.

(21) Appl. No.: 12/027,586

(22) Filed: Feb. 7, 2008

(65) Prior Publication Data

US 2008/0196261 A1 Aug. 21, 2008

Related U.S. Application Data

(60) Provisional application No. 60/890,638, filed on Feb. 20, 2007.

(51) Int. Cl.
*G01B 1/00* (2006.01)
*B43L 7/12* (2006.01)

(52) U.S. Cl. ........................................................ 33/527

(58) Field of Classification Search .................. 33/527, 33/526, 41.1, 41.6, 42
See application file for complete search history.

(56) References Cited

U.S. PATENT DOCUMENTS

| | | | | |
|---|---|---|---|---|
| 325,505 | A * | 9/1885 | Conrad | 33/42 |
| 1,577,569 | A * | 3/1926 | Donley | 33/41.1 |
| 1,877,185 | A * | 9/1932 | Lowe | 33/42 |
| 2,588,757 | A * | 3/1952 | Peeples, Jr. | 33/23.03 |
| 3,548,505 | A * | 12/1970 | Candilo | 33/527 |
| 4,858,327 | A * | 8/1989 | Johns | 33/42 |
| 5,038,490 | A * | 8/1991 | Armstrong | 33/527 |
| 5,471,758 | A * | 12/1995 | White, Sr. | 33/527 |
| 5,862,601 | A * | 1/1999 | O'Brien et al. | 33/42 |
| 6,195,904 | B1 * | 3/2001 | Greer | 33/527 |
| 6,305,090 | B1 * | 10/2001 | Julien | 33/41.5 |
| 6,481,112 | B1 * | 11/2002 | White | 33/527 |
| 6,523,272 | B1 * | 2/2003 | Morales | 33/526 |

* cited by examiner

*Primary Examiner*—Christopher W Fulton
(74) *Attorney, Agent, or Firm*—David Henn

(57) ABSTRACT

A tile marking tool uses a probe mounted on a biased marking arm to engage and follow a contour of an obstruction, such as a wall, cabinet, or heat vent, adjacent which floor tile must be installed. As the tool is moved along the wall, a marking element on the other end of the marking arm marks or cuts the contour of the obstruction on a tile or tiles to be laid, facilitating cutting and/or placement of the tile in such a way as to fit well against the obstruction. Embodiments include a corner marking arrangement for marking tiles to be laid in reentrant corners. The corner marking arrangement includes a corner arm attachable to and orthogonal to the marking arm so that the tool is used in usual fashion as it approaches the reentrant corner.

19 Claims, 4 Drawing Sheets

TILE MARKING AND/OR CUTTING DEVICE

TECHNICAL FIELD

Marking of tiles for cutting.

BACKGROUND AND SUMMARY

Floor tiles are generally laid first in open areas of a floor and are then cut to fit gaps that occur along walls or around obstacles. Many tile marking devices have been proposed for marking tiles to be cut to fit into the resulting gaps. These generally measure a gap and then mark the measurement on a tile, proceeding one tile at a time. A manual method positions a whole tile upside down against a wall or obstruction so that the whole tile overlaps a laid tile, and then a mark is made along the laid tile for a portion of the whole tile to be cut away and turned right side up to fit into the gap. All of these systems mark one tile at a time using procedures that are inconvenient and slow.

Embodiments disclosed herein aim at a faster and more efficient way of marking tiles to fit accurately within gaps between laid tiles and walls or obstructions. Embodiments also cut tiles to be laid directly, rather than first drawing or scratching a profile and then cutting. Embodiments aim at simplicity, low cost, convenience, and accuracy in quickly accomplishing the marking of tiles so they can be cut to fit whatever gap remains to be filled with the pieces along walls or in corners.

The inventive system as illustrated by embodiments disclosed herein begins by positioning whole tiles on top of laid tiles, either individually or along rows of laid tiles. In doing so, embodiments apply to tiles of vinyl, ceramic, and other materials. A marking device having a probe and a marking element separated from the probe by a tile width is moved along a single tile or preferably along a whole row of tile. Marking element here encompasses drawing elements, such as pens, markers, pencils, paintbrushes, and chalk, scratching elements, such as knives and abrasive elements, and cutting elements, such as saws, lasers, and other tools used for cutting tile. As the probe follows a wall or obstruction, the marking element, which is spaced a tile width away from the probe, marks the tile or tiles along a line parallel with and spaced from the wall or obstruction. The marked tiles can then be cut along the marked line, and the cut off pieces will fit accurately into the space between the laid tiles and the wall or obstruction. Alternatively, where the marking element is a cutting element, it cuts the tile parallel with and spaced from the wall or obstruction so that the cut tile will fit into the space between the laid tiles and the wall or obstruction.

A preferred way of accomplishing this is with a base that includes a fence that can guide along the edges of laid tiles and the superposed tiles. The base also includes a spring that lightly presses the probe away from the fence to contact and stay engaged with a wall or obstruction as the base moves along, the superposed whole tiles are restrained by the fence from moving toward the wall or obstruction, and a board or straight edge can be laid along the edge of the superposed tiles opposite the wall to keep the superposed tiles from moving as the base slides along the tile edges. The marking tool can be moved by hand, or a handle extending upward from the base can facilitate the movement along the tile row. The result is then a whole row of tiles accurately marked to fit a gap between laid tiles and a wall or obstruction. The tile marking accomplished this way can automatically follow variations in gap dimensions between the laid tiles and a wall or obstruction.

A special arrangement allows the marking device to mark a corner tile so that it can fit into a corner gap between two walls or between a wall and an obstruction.

DESCRIPTION

Figure 1:
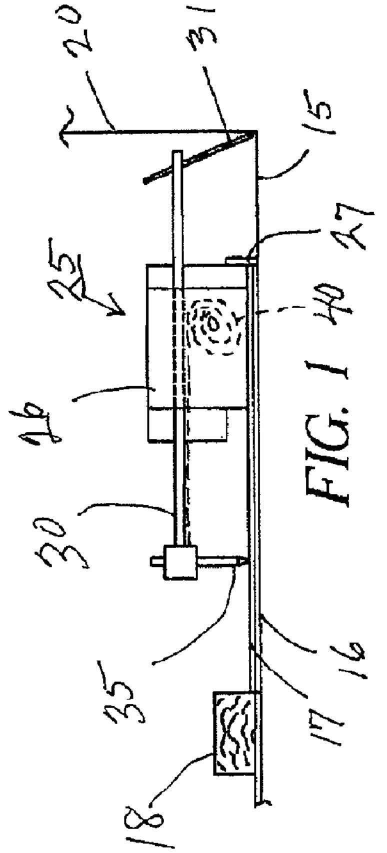
FIGS. 1-3 are partially schematic side elevations of a preferred embodiment of the inventive tile marker deployed to mark tiles for different dimensions of gaps between a laid tile row and a wall.
Figure 2:
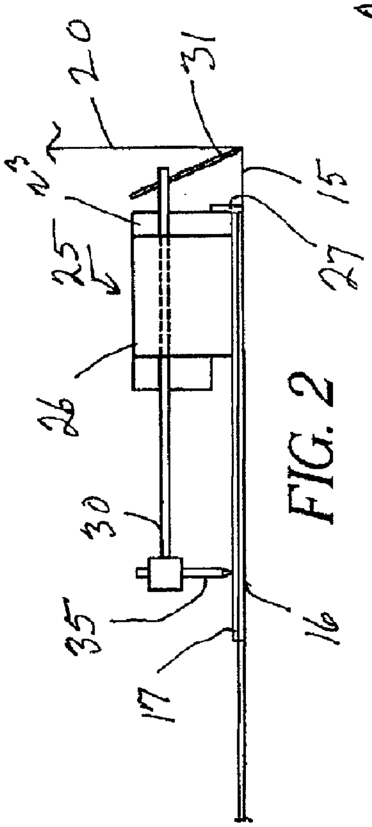
Figure 3:
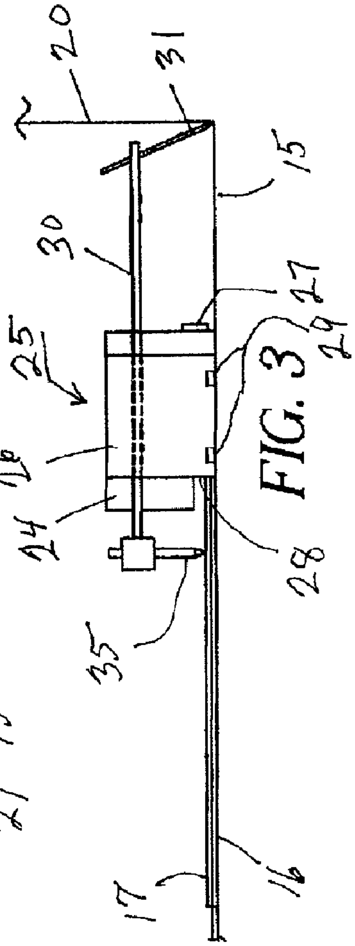

FIGS. 1-3 schematically show how a simplified preferred embodiment 25 of the inventive marking device can be used for marking different dimensions of gaps between a laid tile 16 on floor 15 and a wall or obstacle 20. Tile 17 to be marked is superposed over laid tile 16, and a fence 27 of base 26 guides along the edges of tiles 16 and 17. This allows base 26 and fence 27 to move along a whole row of laid tiles 16 and superposed tiles 17 while marking a line on or cutting superposed tiles 17. To facilitate movement of the base 26, rolling elements, such as wheels, ball bearings, or the like, can be mounted on the base 26 for engagement with a surface beneath the base 26, such as a laid tile 17.

Fence 27 keeps tile 17 from moving toward wall 20. This is because fence 27 also guides on laid tile 16 and thus prevents superposed tile 17 from moving past the edge of laid tile 16. A board or straight edge 18 can be positioned against the rear edge of a superposed tile 17, such as shown in FIG. 1, so that board 18 can run along a row of superposed tiles 17 and help stabilize them against movement away from wall 20 while base 26 and fence 27 slide along the tile edges.

Figure 4:
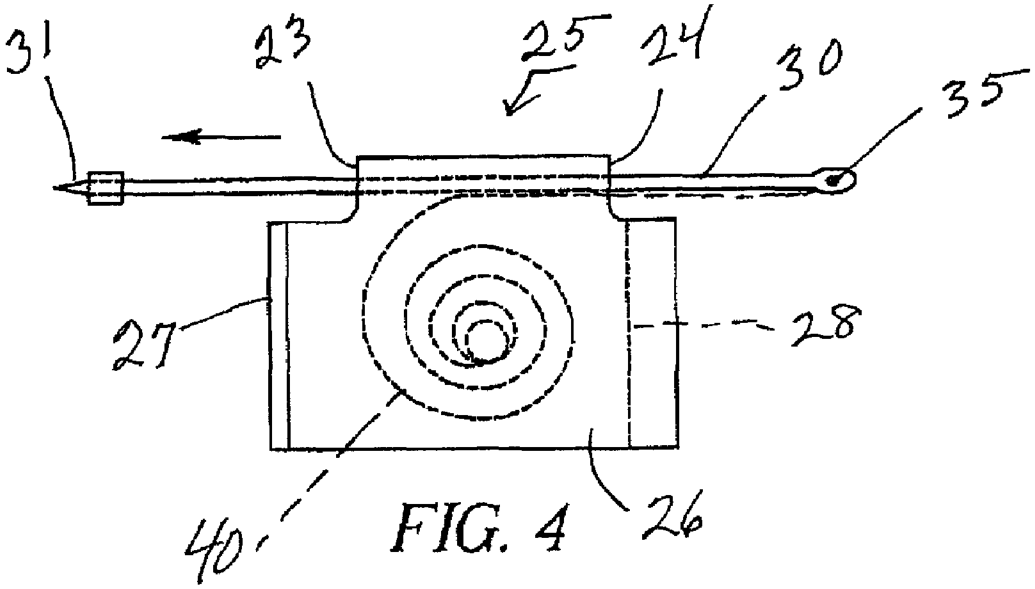
FIG. 4 is a schematic plan view showing how a spring within a base biases a probe and marker rod.

A marking rod 30 is mounted on base 26 to move back and forth under a bias preferably provided by a spring 40, alternative embodiments of which are shown in FIGS. 1 and 4. Different forms of springs can be arranged to accomplish this, and many different connections are possible for different source of springs. The rod 30 includes a probe 31 arranged near a forward end and a marking element 35 arranged near a rear end. The bias of spring 40, however attached to marking rod 30, urges probe 31 gently against wall or obstruction 20 as base 26 and fence 27 move along a tile edge or row of tile edges while marking element 35 marks a line on a superposed tile 17.

The distance between a tip of probe 31 and marking element 35 mounted on rod 30 is preferably equal to a width of tiles 16 and 17. With fence 27 engaging tile edges 16 and 17 and probe 31 engaging wall 20, marking element 35 is then positioned to mark off a dimension on superposed tile 17 equal to the gap distance between laid tiles 16 and wall 20.

When tile 17 is so marked, the piece of tile 17 between marking element 35 and board 18 fits in the gap between laid tile 16 and wall 20. The width of the gap and the corresponding width of the piece to be cut from a superposed tile 17 can vary as marker 25 proceeds along a row of tiles.

Marking element 35 can be any convenient marking instrument, such as a ballpoint pen, felt tip marking pen, pencil, chalk, saw, or knife. As used herein, "marking" includes drawing, as with a pen, pencil, chalk, marker, or other drawing implement, scratching, as with a knife, abrasive element, or other scratching tool, and cutting, as with a tile saw, knife, laser, torch, or other cutting implement. Selection of an appropriate marking element 35 is based on low cost and reliability in marking a line that can be followed to cut a tile or cutting the tile outright. Probe 31 can have a ball bearing or wheel arranged to roll smoothly with reduced friction along a wall or obstruction. In alternative embodiments, a cutting device can be used marking element 35 to simply cut the tile to be marked rather than first marking, then cutting the tile. Thus, marking element 35 can take the form of a saw, laser, torch, heating element, or other device that can cut tile.

FIG. 2 schematically illustrates the same marking device 25 as illustrated in FIG. 1, but positioned to mark a narrower piece of superposed tile 17 fitting a narrower gap between laid tile 16 and wall 20. FIG. 3 schematically illustrates the same tile marking device 25 as illustrated in FIGS. 1 and 2, but positioned to mark for the wider gap between laid tile 16 and wall 20.

As also illustrated in FIG. 3, a notch in a bottom of body 26 serves as a rear fence 28 that can be used to guide along the tile edges instead of front fence 27. Motion of probe 31 and marker arm 35 back and forth within base 26 is limited by the width of base 26, so that rear fence 28 provides an alternative to front fence 27. Fence 28 can then be used, as shown in FIG. 3, when a wide gap exists between laid tile 16 and wall or obstruction 20.

A front vertical notch 23, as shown in FIG. 2, provides a recess to accommodate probe 31 when measuring a narrow gap, and a rear vertical notch 24, as shown in FIG. 3, provides a recess to accommodate marking element 35 when measuring a wide gap. Altogether, base 26 is preferably dimensioned to enable marking of both the smallest and largest possible cuts from superposed tile 17 and any dimension of cut in between these.

Figure 5:
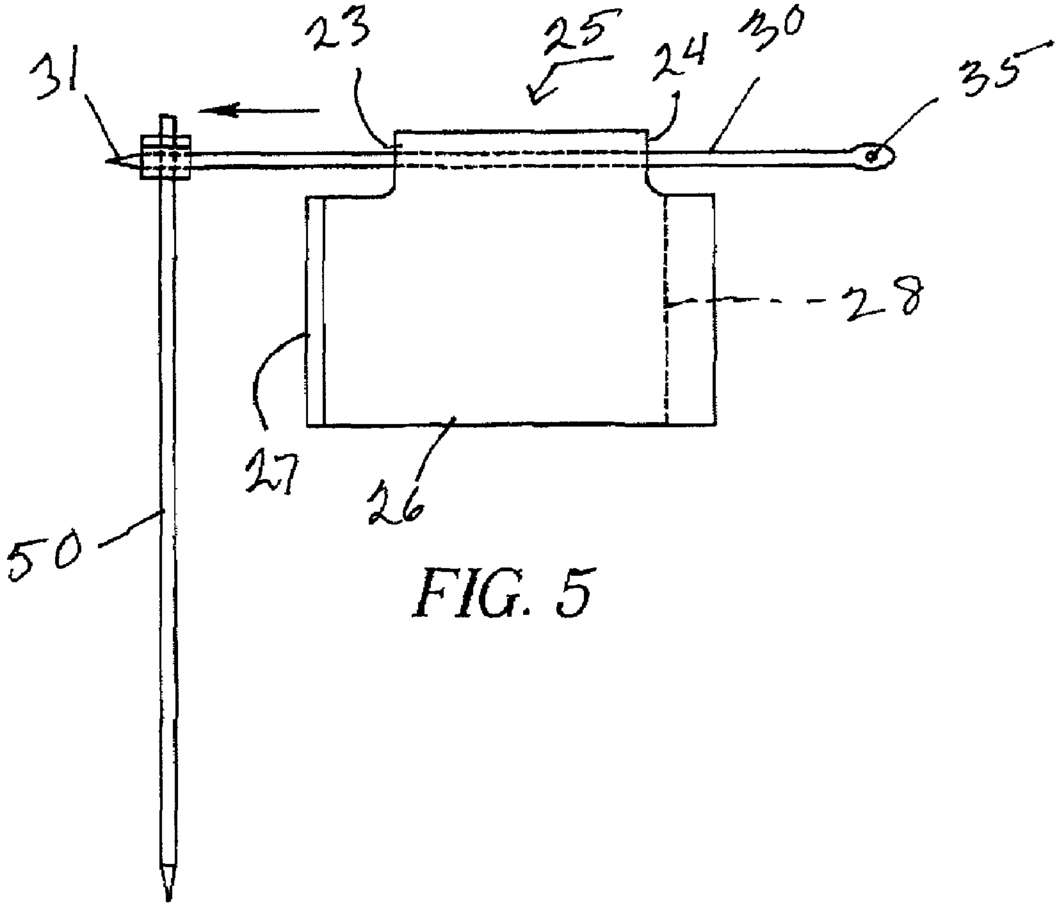
FIG. 5 is a schematic plan view similar to the view of FIG. 4 showing a transverse probe arm clampable to the main probe for corner marking.
Figure 8:
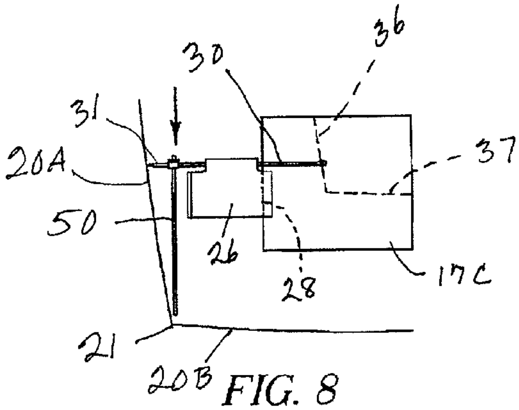
FIGS. 8 and 9 show how a corner tile can be marked to fit into a corner gap where two tile rows intersect.
Figure 9:
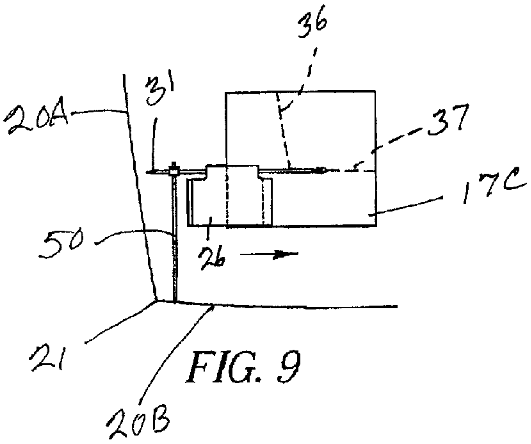
Figure 10:
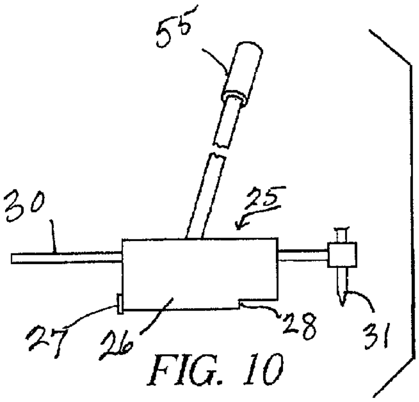
FIG. 10 is a schematic side elevation showing how a handle can be extended above a marking base to facilitate tile marking allowing the user to stand while operating the device.
Figure 11:
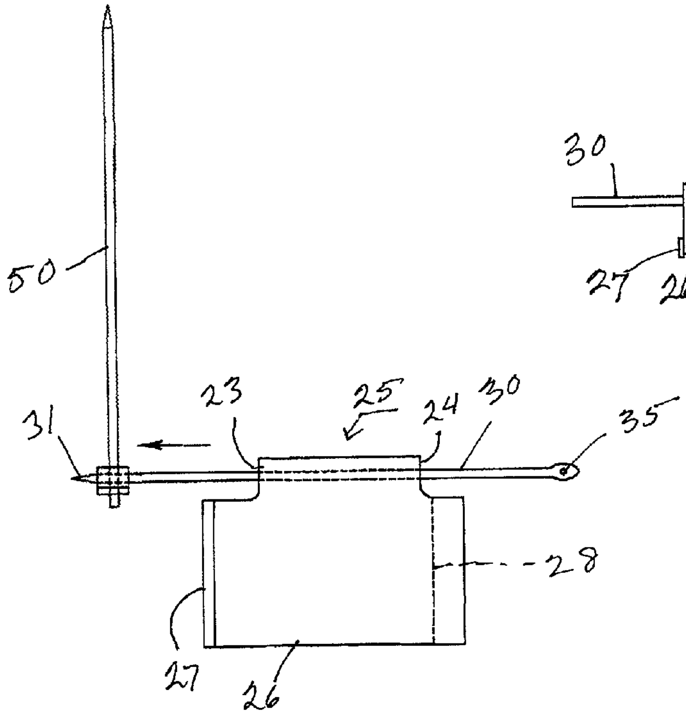
FIG. 11 is a schematic plan view similar to the views of FIGS. 4 and 5 showing a transverse probe arm attachable to the main probe for corner marking and extending in an alternate direction.

FIGS. 5, 8, and 9 schematically show a corner probe 50 clamped to marker arm 30 to aid in corner marking. Probe arm 50 extends from arm 30 by one tile width, just as the distance between probe 31 and marking element 35 equals one tile width. Referring to FIGS. 8 and 9, probe arm 50 allows tile marking tool 25 to guide along an adjacent wall while marking a corner tile 17C for a cut shaped to fit a corner gap, as explained below. While the probe arm 50 is shown extending from the marking arm toward the opposite side of the base 26, the probe arm 50 can instead be mounted to project from the marking arm away from the base, as seen, for example, in FIG. 11. This alternative arrangement can allow for more flexibility in marking corners in that the base 26 does not interfere with the movement of the marking arm toward a corner wall in some circumstances.

Figure 6:
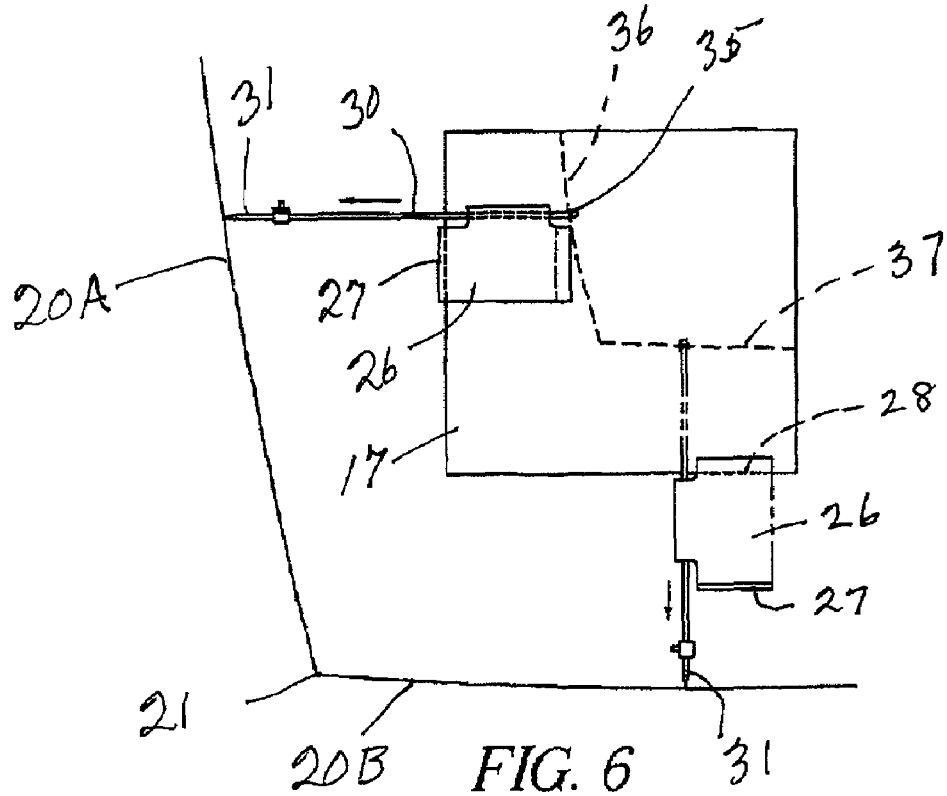
FIGS. 6 and 7 show how rows of tiles can be marked to approach a corner.
Figure 7:
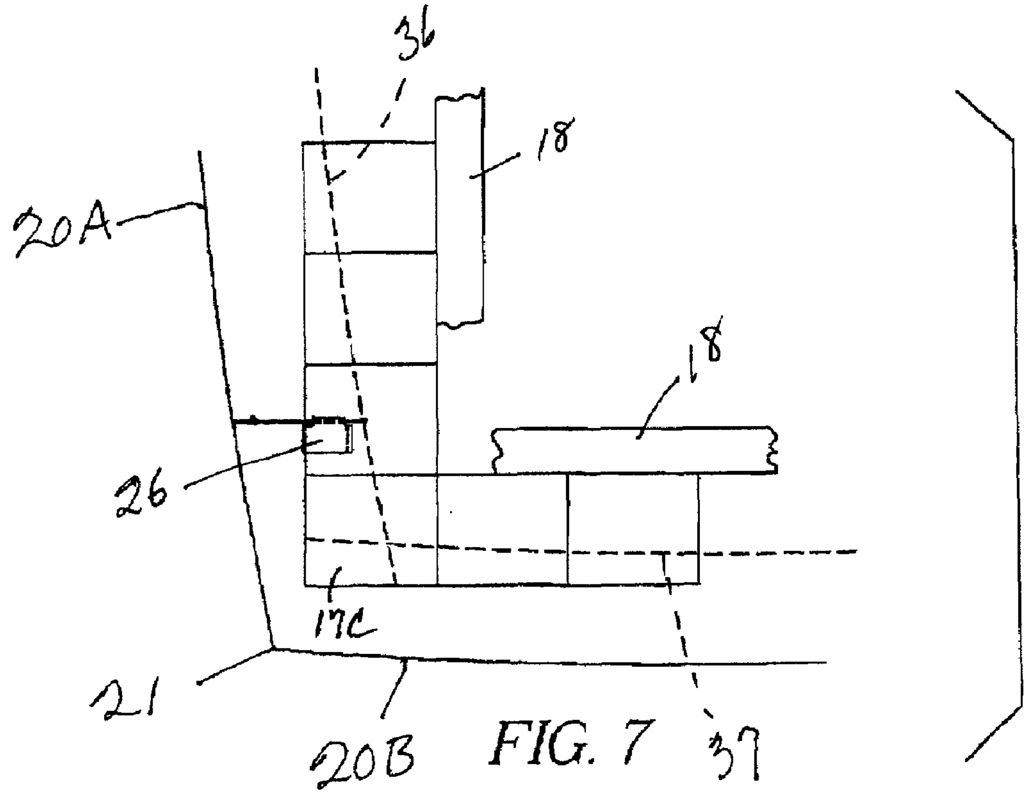

FIGS. 6 and 7 show how rows of tiles 17 can be marked to approach a corner 21 between two walls 20A and 20B. FIG. 7 shows how a row of superposed tiles 17 can be positioned on top of laid tiles (not shown) and possibly stabilized by a board 18 as the tile row extends along wall 20A approaching corner 21. The tiles marked with line 36 can then be cut to fit into the gap between the tile row and wall 20A.

In a similar way, tool 25 can move along tiles 17 in a direction parallel to wall 20B while marking line 37. For this step, the corner-most tile 17C is replaced to form a new tile row extending along wall 20B. Then, as illustrated in FIGS. 6 and 7, tile pieces cut along line 37 can then fit the gap between tiles 17 and wall 20B.

Once the tiles are marked with lines 36 and 37 and/or are then cut to form pieces that fit the gaps along walls 20A and 20B, what remains is an empty corner gap to be marked for a filling tile piece as shown in FIGS. 8 and 9. This requires use of an additional corner tile 17C and the use of corner probe 50, also illustrated in FIGS. 5 and 11. Marking tool 25, with corner probe 50 attached, is moved along tile 17C to approach corner 21 between walls 20A and 20B. Corner probe 50 engages wall 20B and stops probe and marking arm 30 so that marking element 35 stops one tile width short of corner 21. Then marking tool 25 is slid along a top face of tile 17C while holding probe 50 against wall 20B so as to mark line 37 parallel with wall 20B. A corner piece cut from tile 17C along lines 36 and 37 then fits into the tile gap at corner 21. Fence 27 is preferably vertically adjustable so it can be raised to facilitate movement of body 26 over the top surface of tile 17C during marking of line 37. In embodiments in which the marking element 35 directly cuts the corner tile 17C, the corner piece is ready to be placed in the gap as soon as the user has finished with the marking tool 25.

Since marking tool 25 can quickly mark or cut along a whole row of tiles, it is convenient to have a handle 55 extending upward from body 26 so that an operator, after laying a row of superposed tiles 17, can slide body 26 along the tile edges by using handle 55 to mark a whole row of tiles in a few seconds. This saves bending over and crawling about on hands and knees. Rolling elements 29, such as wheels or ball bearings, placed in the base can further ease use of the marking tool 25 as seen, for example, in FIG. 3.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A tile marking system comprising:

a base configured for engagement with and movement along a surface of at least one tile beneath the base;

a first fence attached to the base and configured for selective engagement with and movement along a laid tile;

a marking rod mounted on the base and configured to slide back and forth along a longitudinal axis of the marking rod;

a biasing device connected to the marking rod and the base and providing a bias of the marking rod toward one side of the base;

a probe on a forward end of the marking rod and projecting beyond the one side of the base so that the bias urges the forward end of the rod away from the one side of the base; and a marking element on a rear end of the marking rod arranged to engage a tile to be marked.

2. The tile marking system of claim 1 wherein the biasing device is a spring.

3. The tile marking system of claim 1 wherein the probe can engage an obstruction such that as the base is moved along a line, the probe follows a profile of the obstruction and the marking element marks a surface with the profile of the obstruction.

4. The tile marking system of claim 3 wherein the surface marked by the marking element is at least one tile to be laid adjacent the obstruction.

5. The tile marking system of claim 1 wherein the marking element is a drawing tool.

6. The tile marking system of claim 1 wherein the marking element is a scratching tool.

7. The tile marking system of claim 1 wherein the marking element is a cutting tool.

8. The tile marking system of claim 1 further comprising at least one rolling element in the base with which the base engages the surface beneath the base and supports the base thereon while allowing movement of the base along the surface.

9. The tile marking system of claim 1 wherein the probe includes a rolling element at an engagement end.

10. The tile marking system of claim 1 further comprising a second fence that can selectively engage a laid tile, the first and second fences providing first and second ranges over which the tile marking system can be used.

11. The tile marking system of claim 1 wherein the marking element and the probe are separated by a width of a tile to be marked.

12. A tile marking system comprising:

a base;

a first fence attached to the base and configured for selective engagement with a laid tile;

a marking rod mounted on the base and configured to slide back and forth along a longitudinal axis of the marking rod;

a biasing device connected to the marking rod and the base and providing a bias of the marking rod toward one side of the base;

a probe on a forward end of the marking rod and projecting beyond the one side of the base so that the bias urges the forward end of the rod away from the one side of the base;

a marking element on a rear end of the marking rod arranged to engage a tile to be marked; and a corner arm mounted on and orthogonal to the marking rod such that an end of the corner arm can engage one surface of a reentrant corner of an obstruction while the probe can simultaneously engage another surface of the reentrant corner of an obstruction, thereby enabling marking of a profile of the reentrant corner on a tile to be marked.

13. A method of marking tile comprising:

providing a base and a marking rod mounted on the base;

providing a marking element on one end of the marking rod and a probe on another end of the marking rod;

biasing the marking rod toward the probe end;

placing the base on a surface so that the probe engages a surface of an obstruction and the marking element engages at least one tile to be marked; and moving the base along the surface in a direction such that the probe follows a contour of the obstruction and the marking element marks the contour on the at least one tile to be marked.

14. The method of claim 13 wherein placing the base on a surface comprises placing the base on at least one tile already laid.

15. The method of claim 13 wherein moving the base along the surface in a direction comprises moving the base in a straight line.

16. The method of claim 15 further comprising providing a first fence configured to engage and move along an edge of laid tile and moving the base along the surface in a direction comprises moving the base while keeping the first fence in engagement with and moving the fence along the edge of the laid tile.

17. The method of claim 15 further comprising restraining at least one tile to be marked from moving while being marked.

18. The method of claim 13 further comprising providing a corner arm selectively mounted on and orthogonal to the marking rod, approaching a reentrant corner of an obstruction with the base while engaging one surface of the reentrant corner with the probe, and moving the base away from the reentrant corner along an edge of the at least one tile to be marked once an end of the corner probe engages another surface of the reentrant corner, retaining the end of the corner probe in engagement with the another surface until a respective edge of the at least one tile to be marked has been reached.

19. The method of claim 13 further comprising providing and mounting on the base a handle of sufficient length to allow movement of the base while a user is in a standing position.

* * * * *